UNITED STATES PATENT OFFICE.

JOHN STOLTENBERG, OF DURANT, IOWA.

SWEEPING COMPOUND.

No. 877,137.  Specification of Letters Patent.  Patented Jan. 21, 1908.

Application filed July 1, 1907. Serial No. 381,788.

*To all whom it may concern:*

Be it known that I, JOHN STOLTENBERG, a citizen of the United States, residing in Durant, in the county of Cedar and State of Iowa, have invented certain new and useful Improvements in Sweeping Compounds; and I do hereby declare the following to be a full, clear, and exact description of the same.

This invention is designed to take the place of the sawdust ordinarily spread over the surface of rooms prior to the sweeping thereof. When sawdust is so employed it is required to be moistened in order to collect the dirt and absorb the particles of dust.

The object of this invention is to dispense with the employment of wet sawdust at present used as a dust absorbent and to provide a sweeping compound which will render the work of sweeping dustless and be equally well adapted to the sweeping of carpets and bare floors and surfaces and possesses perfect cleaning characteristics.

My improved dust absorbent is composed of sawdust, petroleum, turpentine, lime water and a trace of carbolic acid, which ingredients are thoroughly intermixed forming a heavy and slightly adhesive compound.

In carrying out the invention, the elements are mixed in the proportion of two pounds of sawdust, ¼ pound of petroleum ¼ pound of turpentine, ⅛ pound of lime water and a trace of carbolic acid.

For a mixture of the compound weighing approximately two hundred and ten pounds the proportions of the ingredients used would be about as follows: sawdust 160 pounds, petroleum 20 pounds, turpentine 20 pounds, lime water 10 pounds, to all of which is added a half pound or less of carbolic acid. After these ingredients have been thoroughly intermixed there will be produced a somewhat moist and adhesive compound which is free to be scattered over the surface to be swept.

Either crude petroleum or kerosene may be used in the preparation of the sweeping compound, and when thus prepared it will readily absorb all particles of dust during the operation of sweeping the carpet or floor over which it has been strewn, thus permitting of an absolutely dry and dustless sweeping.

Having thus described the invention, what is claimed as new and is desired to be protected by Letters Patent is—

A dustless sweeping compound comprising a mixture of sawdust, petroleum, turpentine, lime water and carbolic acid, the whole being intermixed in about the proportions set forth.

In testimony whereof I have affixed my signature in the presence of two subscribing witnesses.

JOHN STOLTENBERG.

Witnesses:
J. A. HANLEY,
E. L. GILBERT.